(12) United States Patent
Hickman (10) Patent No.: US 11,407,117 B1
(45) Date of Patent: Aug. 9, 2022

(54) ROBOT CENTERED AUGMENTED REALITY SYSTEM

(71) Applicant: X Development LLC, Mountain View, CA (US)

(72) Inventor: Craig Hickman, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 533 days.

(21) Appl. No.: 16/545,769

(22) Filed: Aug. 20, 2019

(51) Int. Cl.
| | |
|---|---|
| *B25J 9/16* | (2006.01) |
| *B25J 19/02* | (2006.01) |
| *G06T 7/70* | (2017.01) |
| *G06K 9/62* | (2022.01) |
| *G06N 20/00* | (2019.01) |

(52) U.S. Cl.
CPC .......... *B25J 9/1697* (2013.01); *B25J 9/1664* (2013.01); *B25J 19/023* (2013.01); *G06K 9/6267* (2013.01); *G06N 20/00* (2019.01); *G06T 7/70* (2017.01)

(58) Field of Classification Search
CPC ....... B25J 9/1697; B25J 9/1664; B25J 19/023
See application file for complete search history.

(56) References Cited

U.S. PATENT DOCUMENTS

| | | |
|---|---|---|
| 8,918,208 B1 | 12/2014 | Hickman et al. |
| 9,473,594 B1 | 10/2016 | Hickman et al. |
| 9,522,471 B2 * | 12/2016 | Kuffner, Jr. ............... B25J 19/06 |
| 9,895,802 B1 | 2/2018 | Hickman et al. |
| 10,668,621 B1 * | 6/2020 | Caldara .................. G06T 7/0004 |
| 2013/0329011 A1 * | 12/2013 | Lee .......................... G06F 3/011 348/46 |
| 2014/0025331 A1 * | 1/2014 | Ma ........................ G01C 21/005 702/141 |
| 2015/0228114 A1 * | 8/2015 | Shapira ................... G06T 15/04 345/421 |
| 2016/0288330 A1 * | 10/2016 | Konolige ............. H04N 13/239 |
| 2018/0012370 A1 * | 1/2018 | Aghamohammadi ....................... G05D 1/0274 |
| 2018/0041667 A1 * | 2/2018 | Linnell ................... B25J 9/1633 |
| 2019/0043203 A1 * | 2/2019 | Fleishman .............. G06T 17/00 |

FOREIGN PATENT DOCUMENTS

| | | |
|---|---|---|
| CN | 108519717 A | 9/2018 |
| JP | 6039611 B2 | 11/2014 |
| KR | 20090072038 A | 7/2009 |

\* cited by examiner

*Primary Examiner* — Kira Nguyen
(74) *Attorney, Agent, or Firm* — McDonnell Boehnen Hulbert & Berghoff LLP (57) ABSTRACT

A method includes determining a voxel grid representation of occupied voxels of an environment of a robotic device based on sensor data from a depth sensor on the robotic device. The method further includes assigning a plurality of occupied voxels from the voxel grid representation to a surface within the environment. The method additionally includes determining an image to project onto the surface with a projector on the robotic device. The method further includes modifying the image to fit the surface within the environment based on the plurality of occupied voxels assigned to the surface. The method also includes causing the projector coupled to the robotic device to project the modified image onto the surface in the environment.

20 Claims, 8 Drawing Sheets

ROBOT CENTERED AUGMENTED REALITY SYSTEM

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve a robot centered augmented reality system. A robot may be equipped with a projector to project images onto surfaces in an environment. The robot may determine world state information and use that information to modify projected images to provide dynamic, robot-centric augmented reality.

In an embodiment, a method includes determining a voxel grid representation of occupied voxels of an environment of a robotic device based on sensor data from a depth sensor on the robotic device. The method further includes assigning a plurality of occupied voxels from the voxel grid representation to a surface within the environment. The method additionally includes determining an image to project onto the surface with a projector on the robotic device. The method further includes modifying the image to fit the surface within the environment based on the plurality of occupied voxels assigned to the surface. The method also includes causing the projector coupled to the robotic device to project the modified image onto the surface in the environment.

In another embodiment, a robotic device includes a projector on the robotic device and a control system. The control system may be configured to determine a voxel grid representation of occupied voxels of an environment of the robotic device based on sensor data from a depth sensor on the robotic device. The control system may be further configured to assign a plurality of occupied voxels from the voxel grid representation to a surface within the environment. The control system may also be configured to determine an image to project onto the surface with the projector on the robotic device. The control system may additionally be configured to modify the image to fit the surface within the environment based on the plurality of occupied voxels assigned to the surface. The control system may be further configured to cause the projector coupled to the robotic device to project the modified image onto the surface in the environment.

In a further embodiment, a non-transitory computer readable medium is provided which includes programming instructions executable by at least one processor to cause the at least one processor to perform functions. The functions include determining a voxel grid representation of occupied voxels of an environment of a robotic device based on sensor data from a depth sensor on the robotic device. The functions further include assigning a plurality of occupied voxels from the voxel grid representation to a surface within the environment. The functions additionally include determining an image to project onto the surface with a projector on the robotic device. The functions further include modifying the image to fit the surface within the environment based on the plurality of occupied voxels assigned to the surface. The functions also include causing the projector coupled to the robotic device to project the modified image onto the surface in the environment.

In another embodiment, a system is provided that includes means for determining a voxel grid representation of occupied voxels of an environment of a robotic device based on sensor data from a depth sensor on the robotic device. The system further includes means for assigning a plurality of occupied voxels from the voxel grid representation to a surface within the environment. The system additionally includes means for determining an image to project onto the surface with a projector on the robotic device. The system further includes means for modifying the image to fit the surface within the environment based on the plurality of occupied voxels assigned to the surface. The system also includes means for causing the projector coupled to the robotic device to project the modified image onto the surface in the environment.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

A common problem when interacting with robots is determining intent. For instance, when navigating, humans can (relatively) easily understand the intended path of another human who is walking. The same thing cannot necessarily be said about robots, as the main form of locomotion may not telegraph a planned path. In example robots described herein, adding a projector to the head of the robot (or torso or another location) allows for dynamic augmented reality (AR). When navigating, the robot can then display its intended path on a ground surface in the environment. In further applications such as when debugging grasping behavior, the robot can highlight real objects with their perceived type, or augment them with metrics such as weight, distance, and/or pose. Using depth information available from a robot's perception suite, a projected image can be modified (e.g., keystoned, warped, translated, and/or skewed) to match a surface which is being augmented. The capabilities enabled by allowing a robot to project dynamic images onto the real world may be useful for training, operating, and controlling robots.

Example embodiments involve a robot with a built-in projector and adjustable focus on the projector to allow for combining robot pose and environment information from the robot to modify projected images. This setup enables dynamic, robot-centric AR which may be used for a variety of applications, including but not limited to telegraphing planned navigation routes, displaying object classification information, displaying live sensor data (e.g., range, mass, pose, and/or position information), signaling robot intent, or highlighting objects around the robot.

In order to determine how to modify projected images, a robot may develop world state information about its environment. This world state information may include a voxel grid representation of surfaces in the environment. More specifically, a volume may be divided into voxels and information may be stored indicating whether each voxel is occupied or not. The voxel grid representation may be determined based on depth data from at least one depth sensor on the robot, such as a 3D lidar sensor. The world state information may further include information that assigns occupied voxels or groups of voxels to corresponding surfaces in the environment, such as the ground surface or a surface of an object. In order to classify occupied voxels as belonging to a particular surface, additional sensor data may be used, such as image data from at least one camera on the robot.

By developing precise world state information, images may be modified more precisely to fit surfaces in the environment than in non-robotic projector systems. Moreover, by leveraging the sensing capabilities of the robot, a closed-loop system may further refine the accuracy of the world state information after projecting an image. More specifically, after projecting an image toward a target surface in the environment, a camera on the robot may be used to capture image data representative of the target surface. Based on the image data, the world state information may be updated. For instance, one or more occupied voxels may be assigned to the surface and/or one or more occupied voxels previously assigned to the surface may be reassigned to a different surface. After updating the world state information, the projected image may be further adjusted to better fit the image to the target surface in the environment.

In further examples, in order to improve information about a target surface, a robot may be configured to use its projector to rapidly modify an image projected onto the target surface while collecting image data with a camera. For instance, the projector may be configured to rapidly modify lighting, patterns, backgrounds, and/or other properties of the projected image. Quickly capturing a large number of such images may allow the robot to rapidly improve information about the environment, such as object classification, and use this information to snap a projected image to a target surface. In some examples, the robot may use a machine learning model to classify objects. The machine learning model may be trained to take image data as input and provide object properties such as shape and size information which indicate which occupied voxels likely belong to a particular object. In such examples, rapidly modifying a projected image and capturing a series of corresponding images may allow the robot to quickly generate training data to train the machine learning model to better understand how to recognize and classify a particular target object.

In further examples, a robot with a projector capable of dynamic adjustment of projected images may be used to implement a full human robot interaction (HRI) training loop. For instance, it may be difficult for a robot to segment out an object of interest to enable the robot to interact with the object. In some examples, a robot may initially query a human user to provide the initial ground truth about an object of interest in the environment. The robot may then project a series of images onto the object while capturing image data to refine information about the object and to better fit the projected images to the object. The rapidly modified projected images may be visible by the human user to inform the human user that the classification process is ongoing. The robot may then highlight the object with a projected image and query the user to verify that the intended object is highlighted and/or to verify the fit of the projected image to the object.

In additional examples, a projector may be used by a robot to project the robot's planned navigation path onto a ground surface in the environment. The projected image may be adjusted based on depth information to accommodate non-flat surfaces such as ramps. In some examples, a distance at which the projector is capable of focusing may be determined and used to determine how far out to project an image representing a planned navigation path. In further examples, one or more replanning points at which the robot is expected to recalculate its trajectory may be determined and projected into the environment. In additional examples, confidence information about a planned navigation path may be incorporated into a projected image (e.g., to show a range of possible future paths). Different image sets may be used for different applications. In some examples, the projected navigation path may be a gradient path that fades out as the projected image reaches the edge of the projector's useful range.

In some examples, a robot may determine world state information which includes a time-dependent voxel grid representation of the environment. More specifically, different voxel representations may be determined for multiple different points in time. A time-dependent voxel grid may allow a robot to accommodate moving objects when determining how to project images into the environment. In some examples, decay may be applied to voxels associated with moving objects and/or future locations of moving objects may be predicted so that images projected by the robot's projector do not unexpectedly hit unintended surfaces.

In further examples, information may be shared between robots to improve the accuracy of world state information and/or projected images. For instance, this shared information may include semantic localization information. If a first robot's path is blocked, the robot may determine whether the blocking object is temporary (e.g., a cart with wheels or a human user) or relatively permanent (e.g., a desk or wall). Once the first robot determines a semantic label, the robot may push this information out to a second robot. In response to receiving this information, the second robot may use this information to adjust its planned navigation path and an image projected by the robot into the environment. Shared information between multiple robots may be factored into robot centered AR systems in other ways in further examples.

II. EXAMPLE ROBOTIC SYSTEMS

Figure 1:
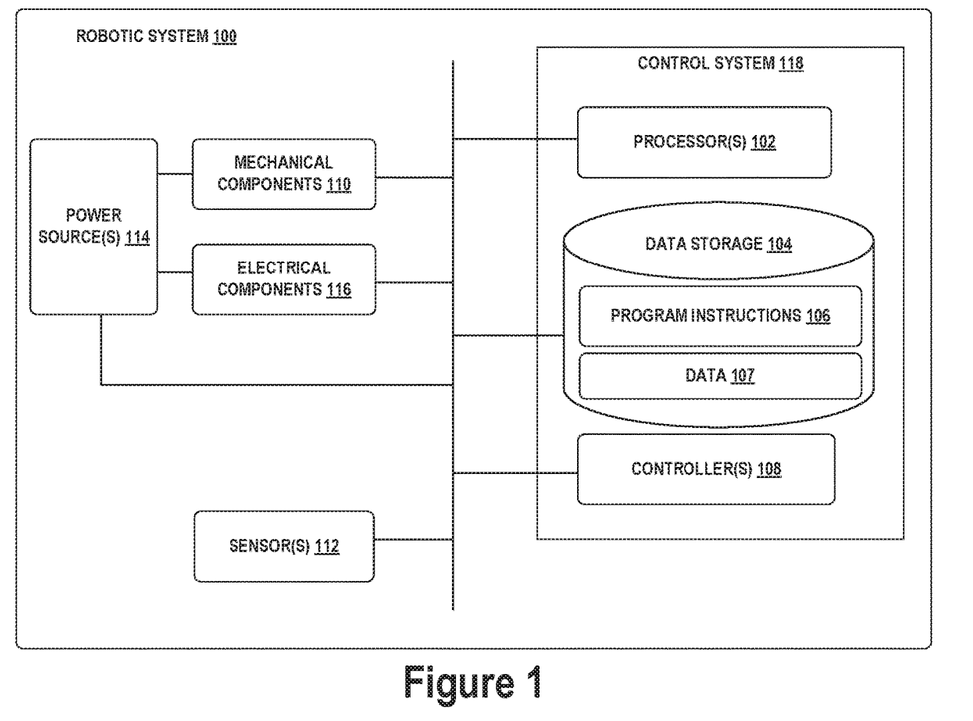
FIG. 1 illustrates a configuration of a robotic system, in accordance with example embodiments.

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location.

Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
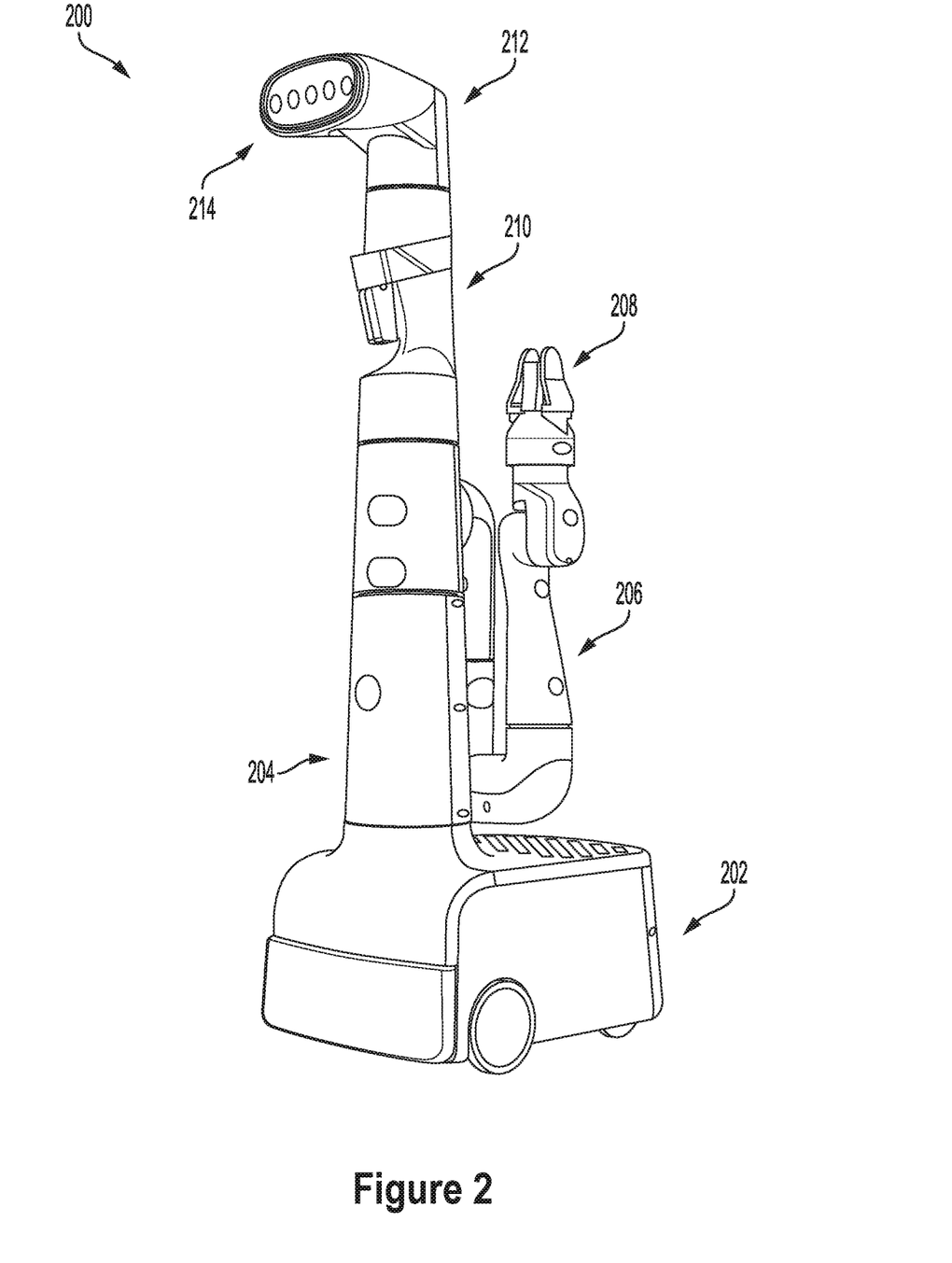
FIG. 2 illustrates a mobile robot, in accordance with example embodiments.
Figure 3:
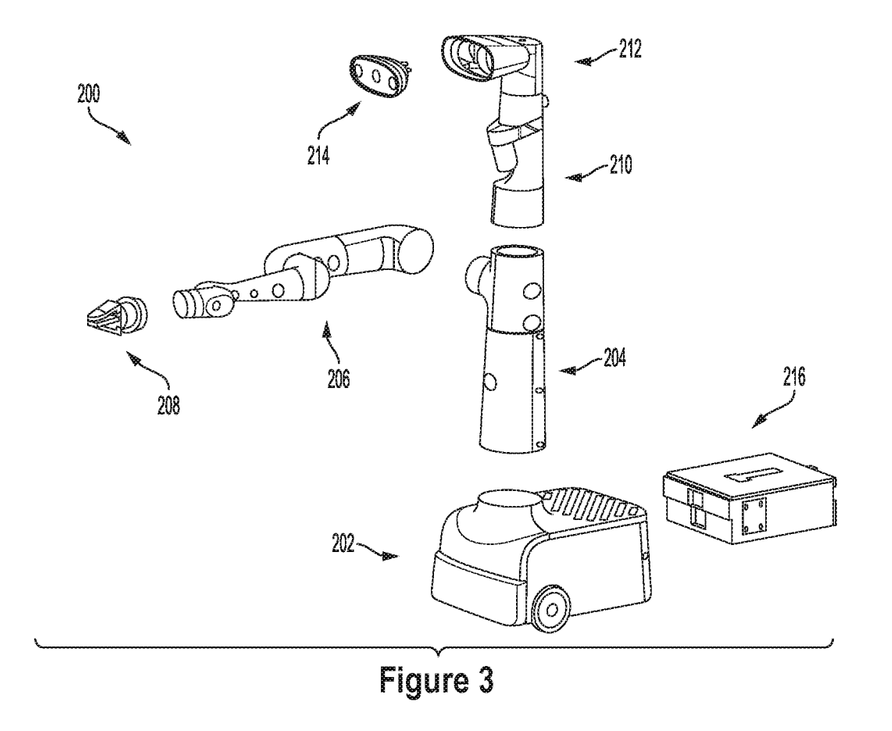
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw 30 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
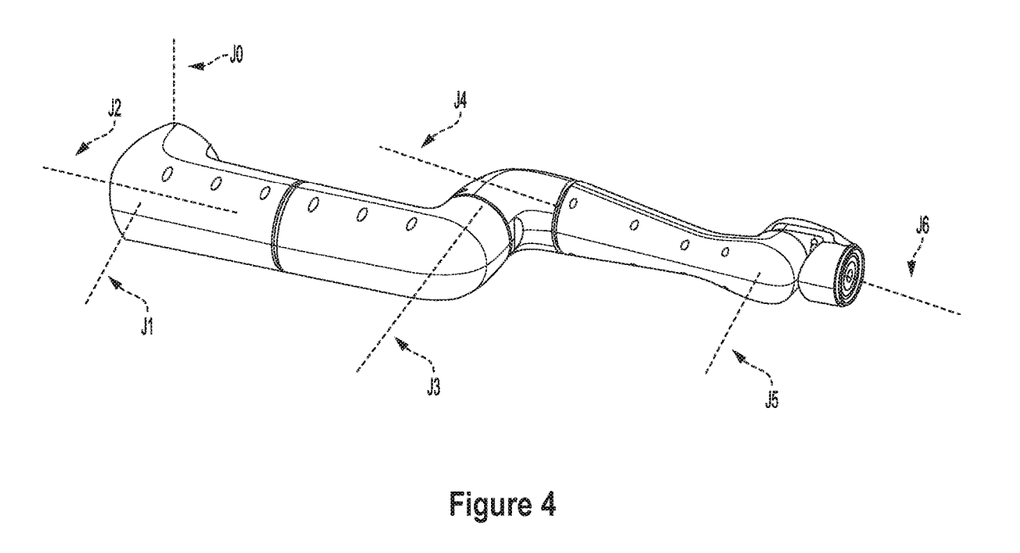
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch 33 joint, a forearm roll J4 joint, a wrist pitch J5 joint, and wrist roll 36 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch 33 joint, a forearm roll J4 joint, a wrist pitch J5 joint, and wrist roll 36 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
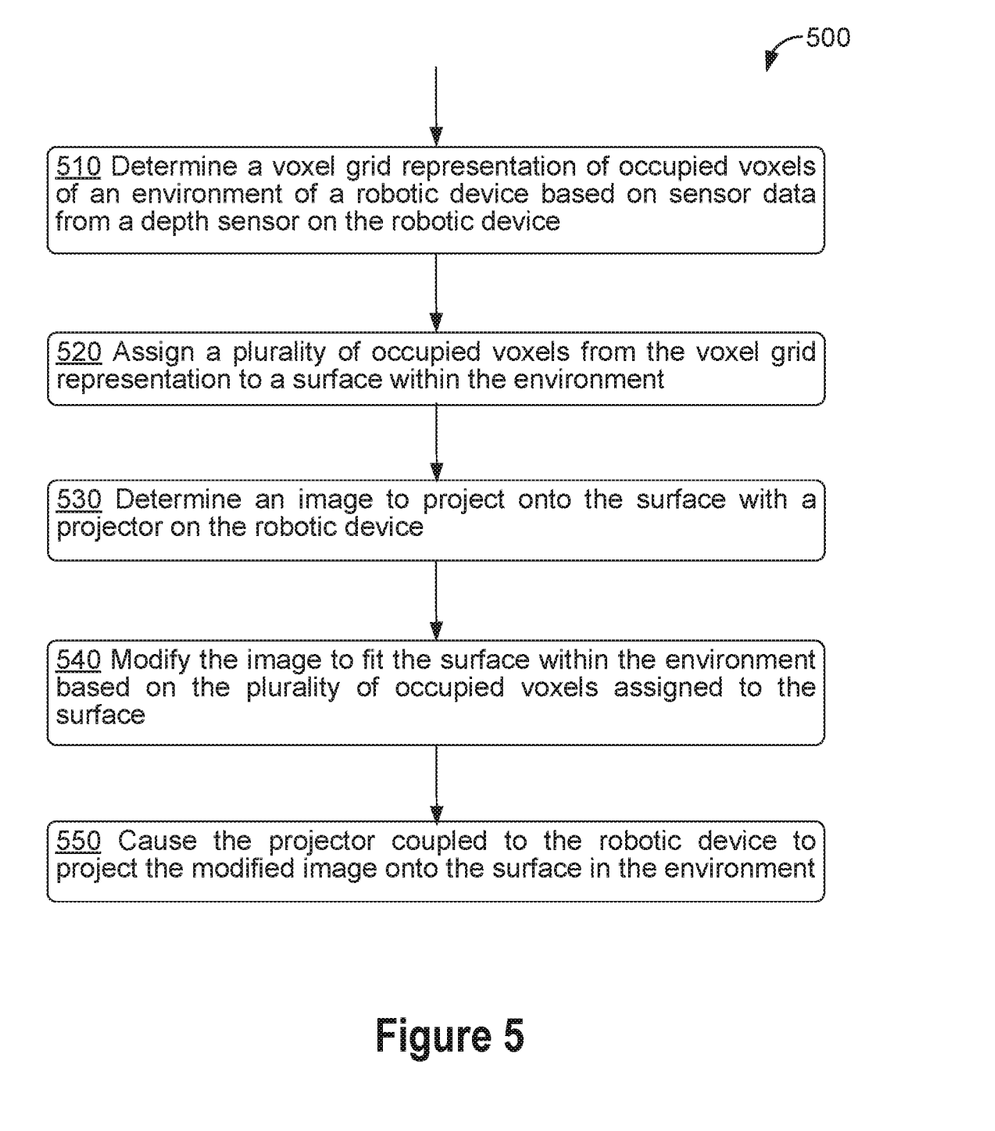
FIG. 5 is a block diagram of a method, in accordance with example embodiments.

FIG. 5 is a block diagram of a method, in accordance with example embodiments. In some examples, method 500 of FIG. 5 may be carried out by a control system, such as control system 118 of robotic system 100. In further examples, method 500 may be carried by one or more processors, such as processor(s) 102, executing program instructions, such as program instructions 106, stored in a data storage, such as data storage 104. Execution of method 500 may involve a robotic device, such as illustrated and described with respect to FIGS. 1-4. Other robotic devices may also be used in the performance of method 500. In further examples, some or all of the blocks of method 500 may be performed by a control system remote from the robotic device. In yet further examples, different blocks of method 500 may be performed by different control systems, located on and/or remote from a robotic device.

At block 510, method 500 includes determining a voxel grid representation of occupied voxels of an environment of a robotic device. The voxel grid representation may include binary data indicating where individual voxels in the space are occupied. Different levels of granularity may be used for the size of the voxels. The voxel grid representation may be determined based on sensor data from at least one depth sensor on the robotic device, such as a 3D lidar sensor. Other sensors may be used to determine the voxel grid representation as well or instead, such as a stereo camera. In further examples, sensor data from one or more other robotic devices may also be used to help determine the voxel grid representation of a space.

In some examples, the voxel grid representation may be time-dependent in order to account for moving objects in the environment. More specifically, decay may be applied by changing occupied voxels associated with moving objects to unoccupied after a certain period of time. In addition, object motions may also be projected out to anticipate future occupied voxels. A time-dependent voxel grid representation may allow for more accurate predictions about potential occluding surfaces in the environment of the robotic device.

At block 520, method 500 includes assigning a plurality of occupied voxels from the voxel grid representation to a surface in the environment. More specifically, a robotic device may allocate groups of occupied voxels to different discrete surfaces within the environment, such as discrete objects, the ground, or walls. In some examples, a machine learning model trained to classify objects based on image data may be used to help segment the environment. Sensor data from one or more cameras or other sensors on the robot may be used to help segment the environment.

The voxel grid representation as well as classifying information associating occupied voxels with corresponding surfaces may be considered world state information. The world state information may also include a pose of the robotic device within the environment. In some examples, the pose of the robotic device and the voxel grid representation may be determined simultaneously as part of a simultaneous localization and mapping (SLAM) process. The robotic device may be configured to continually refine world state information, including information about which voxels are occupied and information about surfaces to which each occupied voxel belongs. Based on current available world state information, the robotic device may identify occupied voxels belonging to a particular surface in an environment, such as the surface of an object or the ground, onto which the robotic device will project an image.

At block 530, method 500 includes determining an image to project onto the surface with a projector on the robotic device. Choice of the image may depend on the particular application. For instance, the image may be a visual representation of a planned navigation path of the robot. In another example, the image may light up or otherwise highlight a particular object of interest in the environment of the robotic device. In further examples, the image may include a representation of live sensor data and/or metrics about a particular object. The image may be a still image, a sequence of still images, or part of a video stream. In various example applications, a variety of different images may be projected by the robot onto surfaces in the robot's environment.

At block 540, method 500 includes modifying the image to fit the surface within the environment. More specifically, the occupied voxels assigned to the surface may be used to adjust an image based on the shape and size of the surface. By leveraging the granularity and accuracy about the world state provided by a robot's sensor suite, an image may be more precisely modified to fit to a target surface than in non-robotic applications. In various examples, modifying the image may involve applying a keystone, skew, translation, and/or warp to better fit the image to the target surface based on the voxels associated with the target surface.

At block 550, method 500 includes causing the projector coupled to the robotic device to project the modified surface onto the surface in the environment. The projector may be focused based on the distance between the projector and a target surface. When the target surface is within a viable range of the projector, the projected image may be used by the robotic device to facilitate communication between the robotic device and a human user through real world AR.

In further examples, the robotic device may continue to refine the image after initially projecting the image onto a target surface in the environment. In some examples, this refinement may be a fully automated process. For instance, the robotic device may capture image data representative of the target surface and projected image with at least one camera on the robotic device. The robotic device may then further adjust the image to improve the real world projection. In particular, the set of occupied voxels associated with the surface may be adjusted by adding and/or removing voxels, and then the projected image may be further refined based on the updated set of voxels. In some examples, the projected image may be rapidly modified by changing the lighting, background, pattern, and/or other aspects of the projected image to collect training data which may be fed into a machine learning classification model to allow the robot to better understand the geometry of a target object. As the robot improves its understanding of a target object, the robot may also adjust the projected image to better fit the image to a target surface in the environment.

In further examples, a robotic device may be configured to interact with a human user in the process of projecting an image onto a target surface. As an initial matter, the robotic device may query the user to identify a relevant object in the environment. For instance, a user may initially state to the robot "hi robot, please learn to pick up my phone." The robot may listen to this command and respond by stating out loud "ok, please show me your phone." The user may then physically present the phone in order to provide ground truth to the robot. The robot may subsequently project a series of images onto the phone while refining its understanding of exactly which voxels encompass the phone. After projecting the series of images, the robot may have a better understanding of the geometry of the user's phone. In some examples, the robot may subsequently query the user to verify its understanding. For instance, the robot may state "does my projected image now cover your phone?" In this manner, an HRI training loop may be enabled to allow the robot to better understand the nature of objects in the environment and convey that understanding to a human user.

Figure 6:
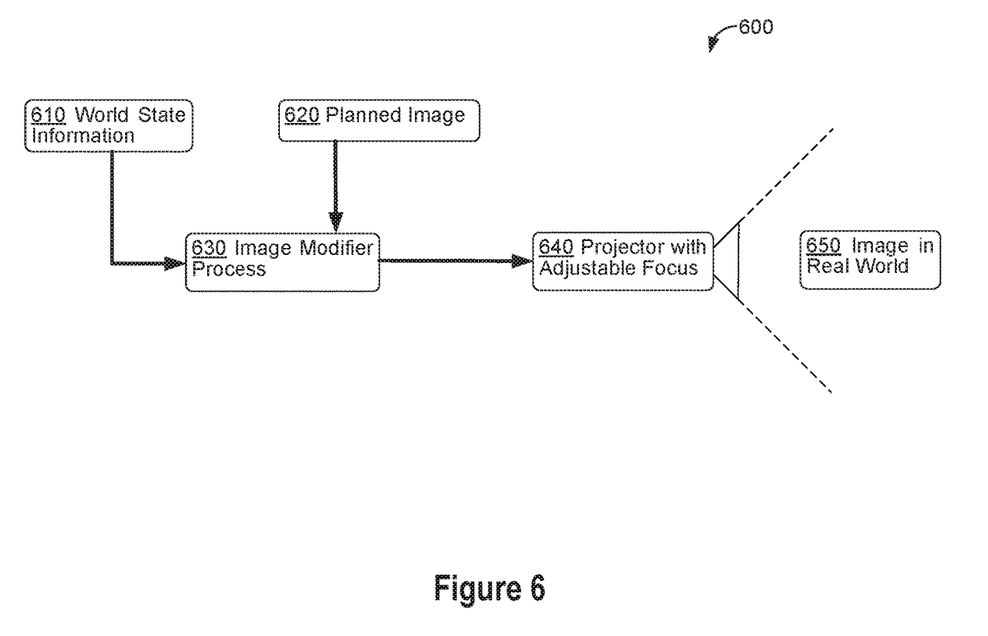
FIG. 6 is an information flow diagram, in accordance with example embodiments.

Next, FIG. 6 is an information flow diagram, in accordance with example embodiments. More specifically, FIG. 6 illustrates an example pipeline 600 that may be utilized by a robotic device in order to provide robot centered AR. In some examples, the robotic device may be the robotic device illustrated and described with respect to FIGS. 1-4, with a projector mounted on the robotic device. The pipeline 600 may also be employed by robotic devices with different form factors as well.

Block 610 includes world state information determined by the robotic device. The world state information may include a voxel grid representation determined using depth sensor data from at least one depth sensor on the robotic device and/or depth sensor data from other robotic devices. The world state information may further include object classification information which associates groups of occupied voxels with corresponding discrete objects or surfaces in the environment. The world state information may further include the pose of the robot and/or the pose of the projector on the robot within the environment. The world state information may additionally include semantic labels for different types of objects in the environment. The world state information may also include other types of information about the environment and/or objects in the environment. In some examples, the voxel grid representation and/or other aspects of world state information may be time-dependent.

Block 620 includes a planned image. The planned image may be a single still image or a series of images or a live video feed. In some examples, the planned image may initially be determined independent of world state information indicating the location and geometry of a particular target surface. The planned image may depend on classification information and/or sensor data associated with a particular target surface. In some examples, a robot may be configured to project a single planned image. In other examples, a robot may be configured to select one of a plurality of different possible images to project depending on the particular application.

Block 630 includes an image modifier process. The image modifier process may incorporate world state information from block 610 to adjust the planned image from block 620. More specifically, the image modifier process may determine how to best fit the planned image onto a target surface given available information about the target surface. The image modifier process may take into account information about the geometry of the target surface, including the size and shape of the target surface. The image modifier process may apply a skew, keystone, warp, and/or translation to better fit the projected image to the target surface. In some examples, the image modifier process may additionally take into account information about the useful range of the projector to determine how to modify the planned image.

Block 640 includes a projector with adjustable focus. The projector may be provided with the modified image resulting from application of the image modifier process in block 630. The focus of the projector may be adjusted based on the pose of the robot and the distance between the robot and the target surface. Given available world state information, the projector may be focused to provide optimal image clarity for the image projected onto the target surface in the environment. By equipping a robot with a projector capable of more refined focus adjustments, the robot's world state information may be more precisely incorporated in producing an AR experience.

Block 650 includes an image projected into the real world. In some examples, the image may be one of a series of images or a live video feed. The projected image may be adjusted over time as the robot collects more precise classification information about a target object. By leveraging a robot's sensing capabilities, a closed-loop projection system may allow for real-time dynamic adjustment of projected images to better fit the projected image onto an object as the robot learns more information about the object and its geometric properties.

Figure 7:
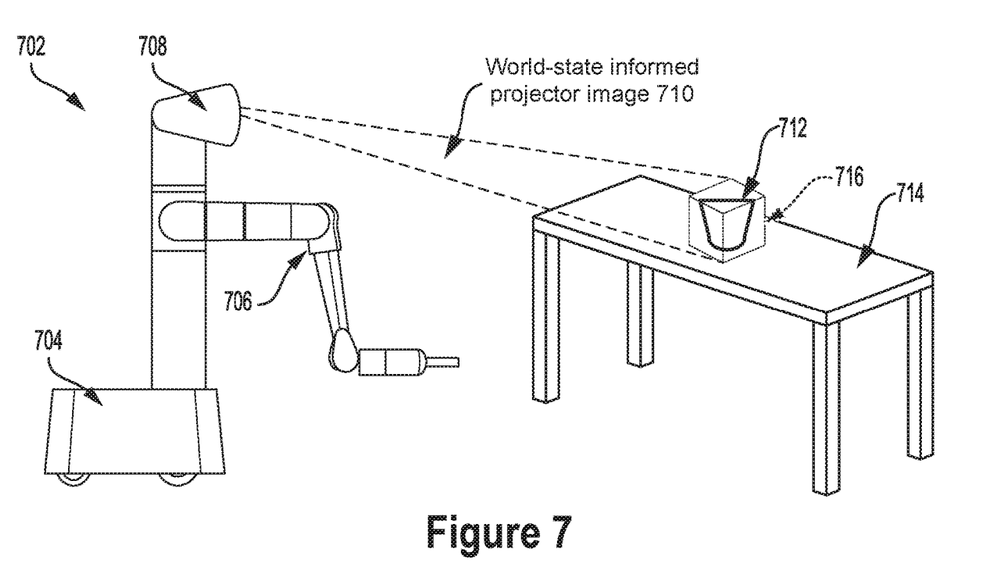
FIG. 7 is a side view of a robot projecting an image onto an object, in accordance with example embodiments.

FIG. 7 is a side view of a robot projecting an image onto an object, in accordance with example embodiments. More specifically, robot 702 includes a mobile base 704, a robotic arm 706, and a projector 708. The robot 702 may be the same or similar to the robot illustrated and described with respect to FIGS. 1-4, and the robot 702 may include a head-mounted projector 708. The robot 702 may determine world state information using one or more depth sensors. The world state information may include depth information about one or more objects in the environment of the robot 702, such as a cup 712 and a table 714. More specifically, the world state information may include a voxel representation in which voxels filled by the cup 712, the table 714, or another object are identified as occupied. The robot 702 may attempt to classify objects such as the cup 712 and the table 714 in order to understand the geometry and/or other properties of the objects. In some examples, object classification may be performed using a trained machine learning model. Based on its understanding of the environment, the robot 702 may determine and project a world-state informed projector image 710 toward the object 712.

In some examples, the robot 702 may determine a bounding box 716 containing the object 712. The robot 702 may then project the image 710 toward the bounding box 716. More specifically, the bounding box 716 may contain all occupied voxels assigned to the object 712. By refining the robot 702's understanding of which occupied voxels belong to the object 712, the robot 702 may adjust the bounding box 716 to better fit the projected image 710 to the object 712.

The projected image 710 may allow the robot 702 to convey information indicating the robot's understanding of the object 712. In an alternative system, a human user may need to connect a separate computing device such as a laptop computer to the robot 702, pull up a visual stream of the robot 702, and run a visualizer application on the computing device in order to understand that the robot 702 has identified the object 712 as a cup. By contrast, for the robot 702 illustrated in FIG. 7, a human user may only need to ask the robot 702 to identify the object 712 or activate an object segmentation mode for the robot 702, and then the robot 702 may responsively use its projector 708 to project the image 710 that includes relevant information about the object 712.

In some examples, the robot 702 may use the projector 708 for intentional scene modification for training. More specifically, suppose the object 712 is a cup for which the robot 702 does not have a prior understanding. The robot 702 may then learn to classify the object 712 as a cup by rapidly modifying the projected image 710 (e.g., lighting or background conditions) while capturing image data with a camera on the robot 702. For instance, the robot 702 could adjust projected images at the maximum capture rate of an imager of the robot 702. By having accurate location information about the object 712 and capturing a wide range of images of the object 712, a robust seed data set may be determined for training an object classification model. For instance, thousands of images of a clear cup with various lightings and backgrounds may be needed for the robot 702 to adequately identify the clear cup.

In some examples, the projected image 710 may allow the robot 702 to convey intent. For instance, the robot 702 may highlight the bounding box 716 and query a user "did you mean this cup?" before picking up the cup with an end effector of robotic arm 706. Object classification is often much faster than physically moving the robot to signal intent. The projector 708 may allow the robot 702 to speed up the process of signaling intent. The robot 702 may also project other types of information towards the cup. As another example, the robot 702 may project a visualization of sensor data collected from a force/torque sensor on an end effector of the robotic arm 706 after interacting with the cup.

Figure 8:
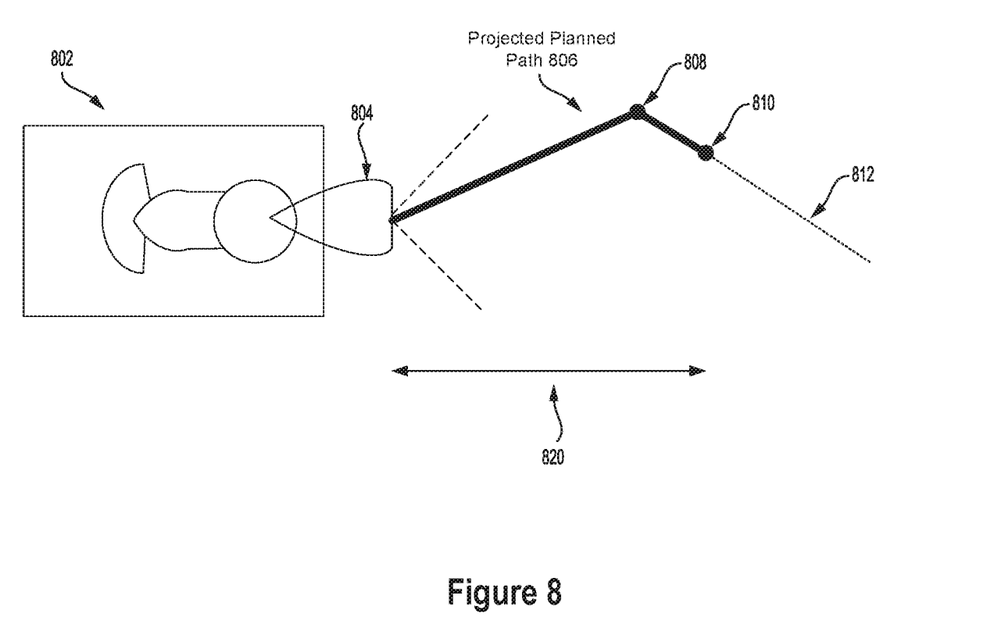
FIG. 8 is a top view of a robot projecting a planned navigation path, in accordance with example embodiments.

FIG. 8 is a top view of a robot projecting a planned navigation path, in accordance with example embodiments. More specifically, the robot 802 may be the same or similar to the robot described with respect to FIGS. 1-4, and may include a projector 804. The robot 802 may use the projector 804 to project its planned path 806 onto a ground surface in the environment. The projected image representing planned path 806 may be informed by world state information indicating the location of the robot 802 and of the ground floor in the environment. For instance, if the ground surface is a ramp or other non-flat surface, the robot 802 may apply a keystone correction to the projected image of the planned path 806. Keystoning occurs when a projector is aligned non-perpendicularly to a projection surface, or when the projection surface is angled. The resulting image may appear distorted (e.g., trapezoidal when a square or rectangular image is desired). Keystone correction involves intentionally modifying the projected image to account for the angled projection and to recreate the original desired image shape.

In some examples, the robot 802 may render one or more legs of straight motion, and one or more replanning points in between the legs of straight motion, such as point 808. A replanning point indicates a point at which the robot plans to correct its course. The robot 802 may then stop and perform a navigation path recalculation at the point 808. A planning system of the robot 802 may predict that the robot will reach point 808 before replanning will potentially be necessary for the robot 802. In some examples, route clearance for the robot 802 is constantly evaluated in the background. If the path under execution is ever determined to be infeasible, an interruption to the path may be provided. Projection of planned navigation path segments separated by replanning points may be particularly beneficial when debugging robot navigation planning.

A projected image may also be adjusted based on a range at which the projector is capable of focusing. For instance, in reference to FIG. 8, the projector 804 of robot 802 may have an effective range indicated by distance 820. Accordingly, the projected image may be determined to stop at point 810, which is at an extreme end of a useful range 820 of the projector 804. Even if the robot 802 has planned out a potential future navigation path 812 beyond the useful range 820 of the projector 804, the robot 802 may limit the extent of the projected navigation path 806 to avoid conveying inaccurate information to a user.

In further examples, planned navigation paths and/or associated measures of confidence may be rendered in different ways. For instance, when the robot is not fully confident about a particular path segment, the robot may project multiple possible path segments or a range of possible future path segments. The robot may also adjust the color or other properties of projected path segments to convey its confidence in particular path segments. In another example, the robot may project a gradient path that fades out as it reaches the edge of the projector's useful range. In further examples, the projected navigation information may be adjusted based on detection of moving objects, such as objects that may obstruct a planned navigation path or planned image. Shared information between multiple robots may also be used to influence projected navigation information. In general, by conveying planned navigation information and optionally also associated confidence information, a robot may facilitate navigation in an environment shared between robots and human users.

In further examples, projected navigation information may include planned motions of different components besides a robot base. For instance, a robot may instead project a planned motion path for a robotic arm or an end effector. A wide variety of other applications of a world-state-informed image projected by a built-in projector of a robotic device are also contemplated.

III. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining a voxel grid representation of occupied voxels of an environment of a robotic device based on sensor data from a depth sensor on the robotic device;
   assigning a plurality of occupied voxels from the voxel grid representation to a surface within the environment;
   determining an image to project onto the surface with a projector on the robotic device;
   modifying the image to fit the surface within the environment based on the plurality of occupied voxels assigned to the surface; and
   causing the projector coupled to the robotic device to project the modified image onto the surface in the environment.

2. The method of claim 1, wherein modifying the image comprises applying one of a keystone, translation, or skew to the image.

3. The method of claim 1, further comprising determining a pose of the robotic device relative to the voxel grid representation, wherein modifying the image is further based on the determined pose of the robotic device.

4. The method of claim 1, further comprising:
   causing a camera on the robotic device to capture an image of the surface in the environment while the projector projects the modified image onto the surface in the environment; and
   adjusting the plurality of occupied voxels assigned to the surface based on the captured image.

5. The method of claim 4, further comprising causing the projector to further refine the modified image based on the adjusted plurality of occupied voxels assigned to the surface in the environment.

6. The method of claim 1, further comprising causing the projector to project a series of images onto the surface in the environment while a camera on the robot captures a plurality of images of the surface in the environment.

7. The method of claim 6, wherein causing the projector to project the series of images onto the surface in the environment comprises causing the projector to rapidly modify at least one of a pattern or lighting.

8. The method of claim 6, further comprising training a machine learning classification model based on the plurality of captured images.

9. The method of claim 8, wherein training the machine learning classification model is performed after initially identifying the surface based on a user query provided by the robotic device.

10. The method of claim 1, wherein the surface is a ground surface in the environment, and wherein the image illustrates a planned navigation route for the robotic device.

11. The method of claim 10, wherein the image is modified based on an incline angle of the ground surface in the environment.

12. The method of claim 10, further comprising determining a measure of uncertainty in the planned navigation route, wherein the image is based on the measure of uncertainty.

13. The method of claim 10, further comprising determining one or more replanning points in the planned navigation route, wherein the image indicates the one or more replanning points.

14. The method of claim 1, wherein the image illustrates at least one of live sensor data or object classification information describing an object that includes the surface.

15. The method of claim 1, wherein the image highlights an object that includes the surface, wherein the method further comprises causing the robotic device to provide a user query to confirm a user selection of the highlighted object.

16. The method of claim 1, wherein the voxel grid is a time-dependent voxel grid, and wherein the method further comprises identifying one or more moving objects based on the time-dependent voxel grid, wherein the modified image is based on the one or more identified moving objects.

17. The method of claim 16, further comprising applying decay to voxels associated with the one or more moving objects in order to determine the modified image.

18. The method of claim 1, further comprising receiving one or more semantic labels associated with the environment from another robot, wherein the modified image is based on the one or more received semantic labels.

19. A robotic device, comprising:
   a projector on the robotic device; and
   a control system configured to:
      determine a voxel grid representation of occupied voxels of an environment of the robotic device based on sensor data from a depth sensor on the robotic device;
      assign a plurality of occupied voxels from the voxel grid representation to a surface within the environment;
      determine an image to project onto the surface with the projector on the robotic device;
      modify the image to fit the surface within the environment based on the plurality of occupied voxels assigned to the surface; and
      cause the projector coupled to the robotic device to project the modified image onto the surface in the environment.

20. A non-transitory computer readable medium comprising program instructions executable by at least one processor to cause the at least processor to perform functions comprising:
   determining a voxel grid representation of occupied voxels of an environment of a robotic device based on sensor data from a depth sensor on the robotic device;
   assigning a plurality of occupied voxels from the voxel grid representation to a surface within the environment;
   determining an image to project onto the surface with a projector on the robotic device;
   modifying the image to fit the surface within the environment based on the plurality of occupied voxels assigned to the surface; and
   causing the projector coupled to the robotic device to project the modified image onto the surface in the environment.

* * * * *